UNITED STATES PATENT OFFICE.

ALFRED STEPHAN, OF GROSS-LICHTERFELDE, NEAR BERLIN, GERMANY.

PROCESS OF MAKING A FORMIC-ALDEHYDE COMPOUND.

No. 812,608.     Specification of Letters Patent.     Patented Feb. 13, 1906.

Application filed December 6, 1904. Serial No. 235,759.

*To all whom it may concern:*

Be it known that I, ALFRED STEPHAN, Ph. D., a subject of the German Emperor, and a resident of Gross-Lichterfelde, near Berlin, Germany, have invented certain new and useful Improvements in Processes of Producing a Compound of Formic Aldehyde, of which the following is a specification.

The basis of the preparation to be produced is phenol. This is converted under the action of formic aldehyde and the use of alkali lye as a condensing medium while being heated into a compound, not known hitherto, which has neither the corrosive qualities of carbolic acid nor the unpleasant smell of the same.

The formic-aldehyde compound can be precipitated from its alkaline solution by adding an acid to the same and is composed of two active components. It contains formic aldehyde partly in a solid combination in the phenol and is partly contained in this condensation product in unstable proportions. Through the enzymatic action of the juices of tissues and pus this compound is decomposed into formic aldehyde and into a derivate of phenol. The compound forms a slightly yellow tinged inodorous and tasteless powder insoluble in water and chloroform, but soluble in alcohol, acids, lyes, ammonia. On being heated this compound can develop formic aldehyde. Also on being boiled the alkaline solution develops formic aldehyde.

It is well known that through the action of equimolecular quantities of formic aldehyde and alkali on phenol at an ordinary temperature oxybenzyl alcohol is formed. (British Patent No. 6,800 of 1894.) The same is easily soluble in water and can therefore not be used as an antiseptic powder for wounds. According to the process which forms the subject of this application the formation of monomeric oxybenzyl alcohol is avoided by effecting the union of formic aldehyde with phenol while heating the same. In this way a polymerization of the oxybenzyl alcohol formed takes place, and the product of the polymerization is, according to the duration of the heating up to 100° centigrade, made insoluble in water, but soluble in alkali. If heated too long, the product is not soluble in any solvent. As the formic aldehyde is used in larger quantities than necessary for the formation of an equimolecular product, formic aldehyde which can be split off is contained in this product of polymerization. The alkali acts during the reaction at the same time as a condensating, polymerizating, and dissolving medium. That the alkali is at the same time a dissolving medium is in so far of importance as the product of the reaction can be precipitated out of its alkaline solution in a very finely distributed state by the addition of an acid. The more voluminous an antiseptic powder is the greater is its absorbing power.

Example: Two hundred grams of phenol are heated in autoclaves with one hundred grams of potash lye 40° Baumé and four hundred grams of a solution of formic aldehyde to about 100° centigrade. A violent reaction takes place and the pressure rises to one-half atmosphere. After the termination of the reaction the compound is heated on the steam-bath until acid from the liquid diluted with water precipitates a voluminous colorless deposit.

The reaction liquid, the combination of alkali, phenol, and formic aldehyde, is intended to be used as a disinfectant; the precipitated, edulcorated, and dried deposit as an antiseptic powder for wounds.

I claim—

Process of producing a compound of phenol and formic aldehyde, consisting in heating phenol and a larger quantity of a solution of formic aldehyde of forty per cent. with an addition of lye, as a condensing medium and dissolvent, until a red-brown liquid is produced out of which acids precipitate a deposit, substantially as and for the purpose set forth.

In testimony whereof I have signed my name to this specification in the presence of two subscribing witnesses.

ALFRED STEPHAN.

Witnesses:
   HENRY HASPER,
   WOLDEMAR HAUPT.